US005099258A

United States Patent [19]

Hirayama

[11] Patent Number: 5,099,258

[45] Date of Patent: Mar. 24, 1992

[54] DOT PRINT DENSITY REGULATING CIRCUIT

[75] Inventor: Yoshihiko Hirayama, Tokyo, Japan

[73] Assignee: Seiko Instruments Inc., Japan

[21] Appl. No.: 569,832

[22] Filed: Aug. 20, 1990

[30] Foreign Application Priority Data

Aug. 23, 1989 [JP] Japan ........................ 1-216293

[51] Int. Cl.[5] ........................ G01D 15/10

[52] U.S. Cl. ........................ 346/76 PH

[58] Field of Search ........................ 346/76 PH

[56] References Cited

U.S. PATENT DOCUMENTS 4,661,703 4/1987 Ishikawa et al. ............ 346/76 PH
4,777,536 11/1988 Kato ............ 346/76 PH

*Primary Examiner*—Benjamin R. Fuller
*Assistant Examiner*—Nancy Le
*Attorney, Agent, or Firm*—Bruce L. Adams; Van C. Wilks

[57] ABSTRACT

In order to avoid density variation due to difference of a print dot rate in a line printer for printing an image and character, a data transfer circuit operates to convert image data inputted through a buffer memory into a plurality of serial data trains. The serial data trains are fed to corresponding shift registers of a print head. The data transfer circuit is also connected to a selecting gate circuit in the form of a demultiplexer. The demultiplexer operates to cyclicly sample the plurality of serial data trains outputted from the data transfer circuit. A counter counts a number of print dots contained in the sampled data so as to measure a print dot rate. A drive pulse width is adjusted according to the print dot rate so as to avoid variation of print density due to difference of the print dot rate.

6 Claims, 4 Drawing Sheets

FIG. 3
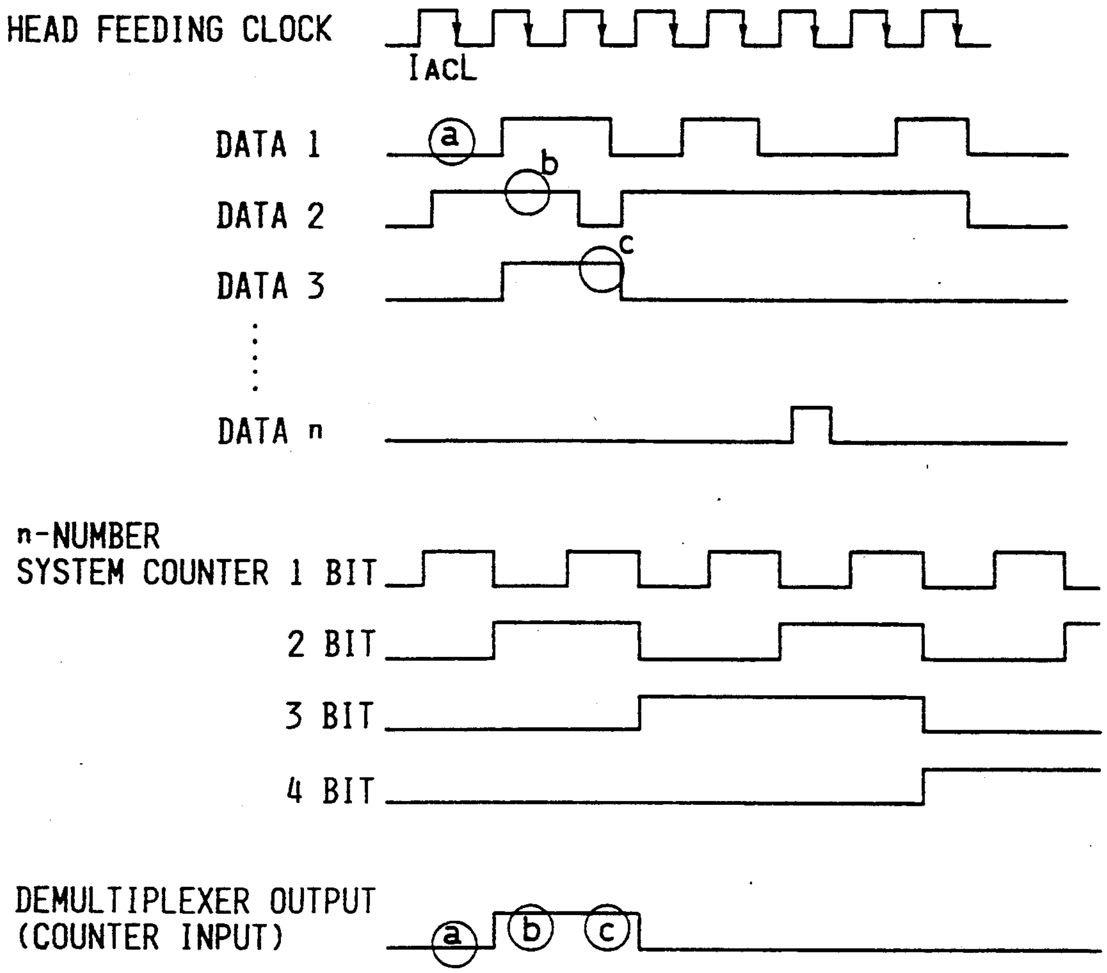
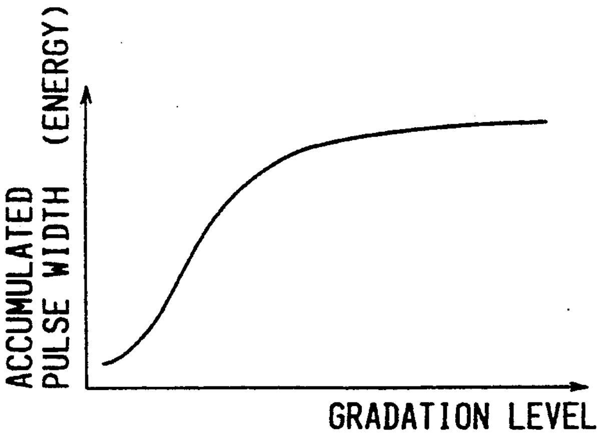
FIG. 4

FIG. 5
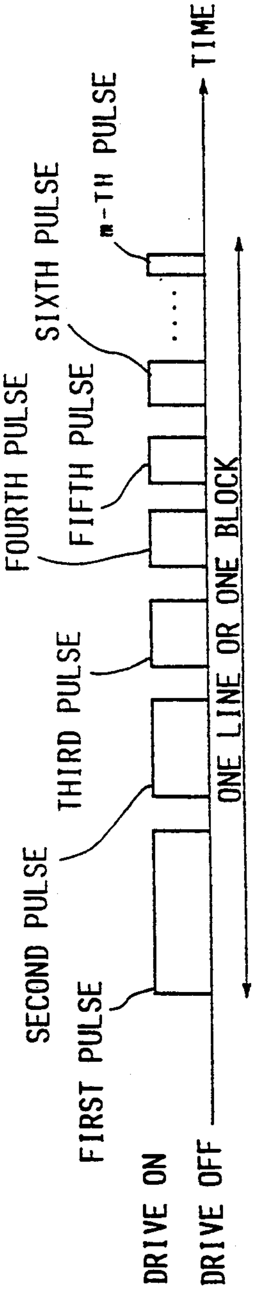
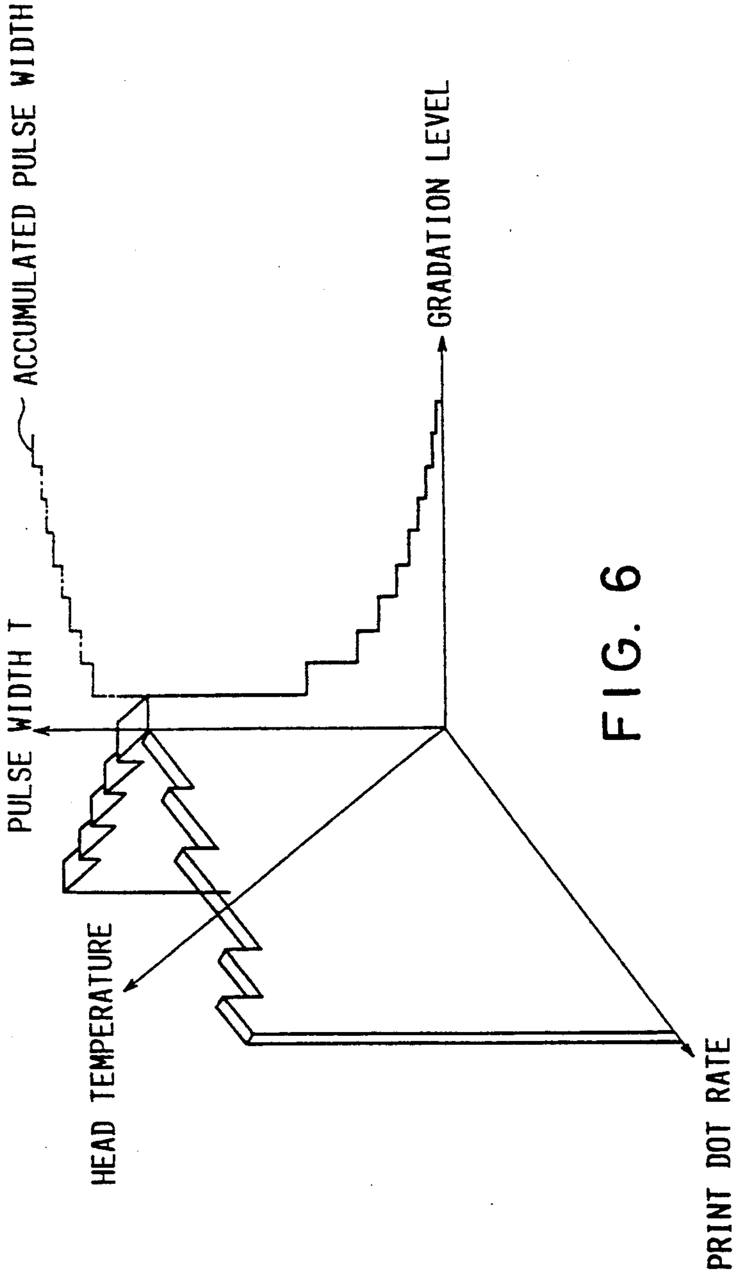
FIG. 6

DOT PRINT DENSITY REGULATING CIRCUIT

BACKGROUND OF THE INVENTION

The present invention relates to a printer of the fast operation type or gradation print type, in which electric energy is supplied to resistive elements of a print head to effect conversion thereof into thermal energy effective to control print intensity, density and gradation according to the magnitude of the thermal energy.

In the conventional printer utilizing a thermal head, printing is effected line by line such that one line printing is undertaken during several tens ms in response to one or two sequence of a drive pulse and a thermally compensative pulse. The thermal head is provided with a shift register for receiving serial data each line printing. A single counting circuit is also provided to count a number of print dots contained in the serial data to determine a print rate which is a ratio of dots to be printed with respect to the total dot number in one line. Consequently, a drive pulse width is varied each line operation according to the dot numbers to be printed so as to prevent degradation of print quality such as reduction of density and defect of blur, which would occur when the print rate is relatively great.

In the conventional multi-gradation printer, as shown in FIG. 5, several ten times of pulsive drive are carried out each line operation. The print density is determined according to the number and width of drive pulses assigned to individual thermal elements. For example, when 2000 number of dot data are transferred to the thermal head by 4 MHz each time within one line operation, it takes 500 ns to complete the data transfer. Therefore, when effecting 64 times of the data transfer for 64 levels of gradation printing within one line operation, it takes 32 ms to finish each line operation. Such speed is practically too slow.

In view of this, the multi-gradation printer requires provision of a plurality of data transfer circuits for transferring the serial data. However, in such case, a single counting circuit could not measure the print rate as in the above described prior art. The print density would be uneven depending on a number of printed dots without effective compensation for the printing rate.

Further, the fast operation printer such as thermal transfer printer carries out each line printing about 1 ms even without gradation. Therefore, transfer of the serial data cannot be effected in time by a single transfer circuit. Therefore, the fast operation printer likewise requires a plurality of the serial data transfer circuits. Consequently, there is caused the problem that a single counting circuit could not measure correctly the printing rate line by line.

SUMMARY OF THE INVENTION

An object of the present invention is to provide a demultiplexer or selecting gate circuit in combination with a transfer circuit which outputs in parallel a plurality of serial data trains so as to periodically or cyclicly select or switch the serial data trains to effect sampling of the serial data such that a single counter can count a number of print dots contained in the sampled serial data to thereby determine the print rate line by line.

According to the invention, the transfer circuit feeds a plurality of serial data trains which are assigned to respective blocks divided along the line of the linear thermal head. The respective serial data trains are time-sharingly sampled so that the single counter can determine the average print rate throughout the widthwise span of image print field.

BRIEF DESCRIPTION OF THE DRAWINGS

FIG. 3 is a timing chart showing the operation of the FIG. 2 circuit; FIG. 4 is a graph showing the relation between gradation density and accumulated pulse width; FIG. 5 is a waveform diagram illustrative of pulsive gradation printing operation; and FIG. 6 is a schematic diagram showing a compensation table for gradation pulses.

DETAILED DESCRIPTION OF EMBODIMENTS

Figure 1:
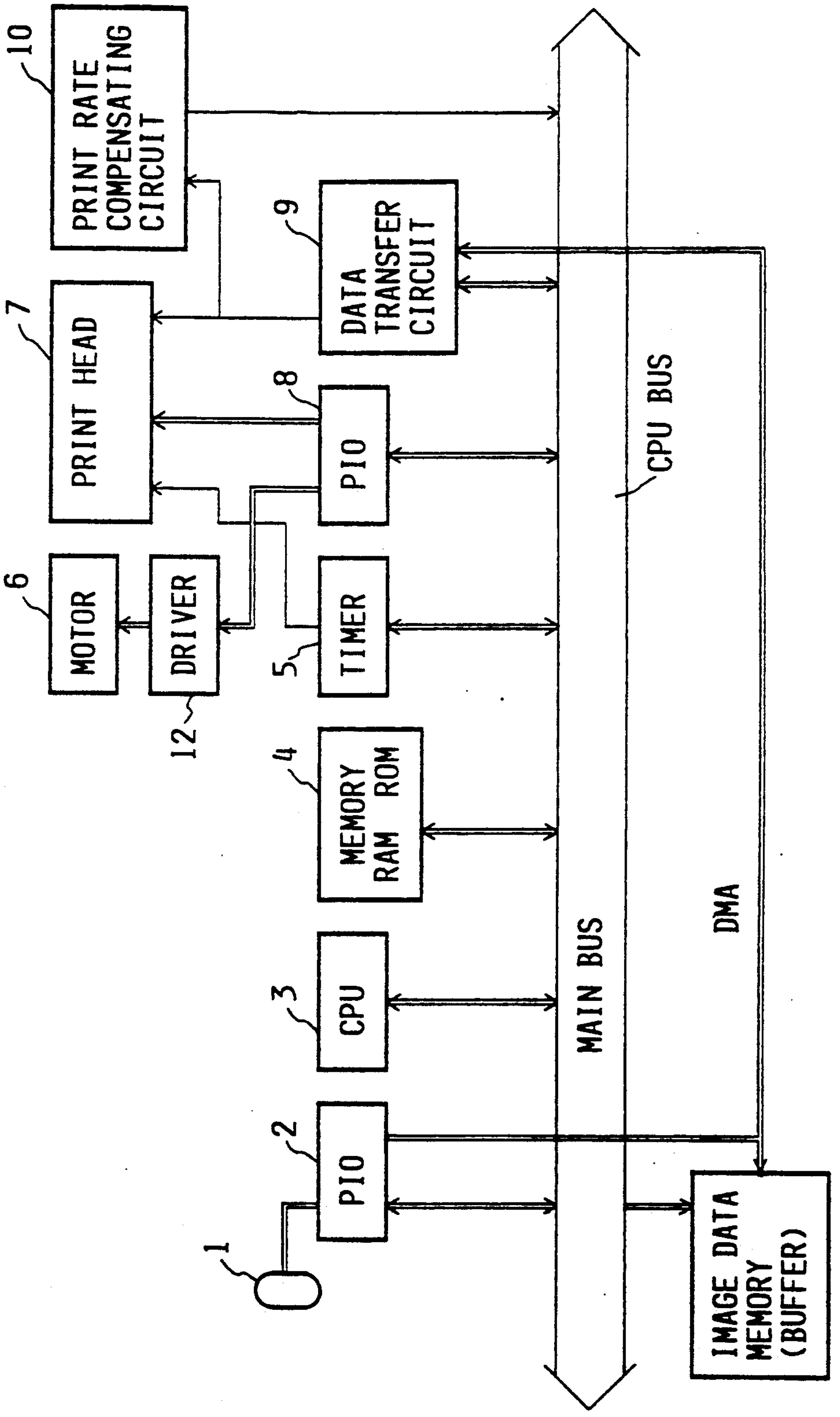
FIG. 1 is a block diagram showing a hardware construction of the image printer.

FIG. 1 is a block diagram showing a hardware structure of the image printer. The printer is comprised of a parallel I/O connector 1, and an interface 2 or PIO (Parallel Input-Output) connected to the parallel I/O connector 1. The parallel interface 2 is composed of Centronics, GPIB (General Purpose-Interface Bus) or SCSI. The printer further includes a CPU 3, a memory 4 for memorizing a farmware and a pulse width table etc., a timer 5, a motor 6 receptive of a signal from an interface 8 and driven by a drive signal from a driver 12, a print head 7 composed of a plurality of dot-forming elements arranged linearly widthwise of a print paper sheet, and a data transfer circuit 9. The data transfer circuit 9 operates to convert gradation data of each one line into a plurality of serial data trains and to transfer the same to corresponding shift registers of the print head 7 each time of pulsive drivings within one time printing. As shown in FIG. 5, the transfer circuit 9 converts a bit of the gradation data into m number of drive pulses for each of thermal elements. The linear print head 7 is divided into n number of blocks. The data transfer circuit 9 outputs n number of the serial data trains to the respective blocks of the print head 7 and concurrently to a print rate compensating circuit 10. A bus DMA is utilized to transfer quickly image data from the memory 4 to the interface 2 or to the data transfer circuit 9.

Figure 2:
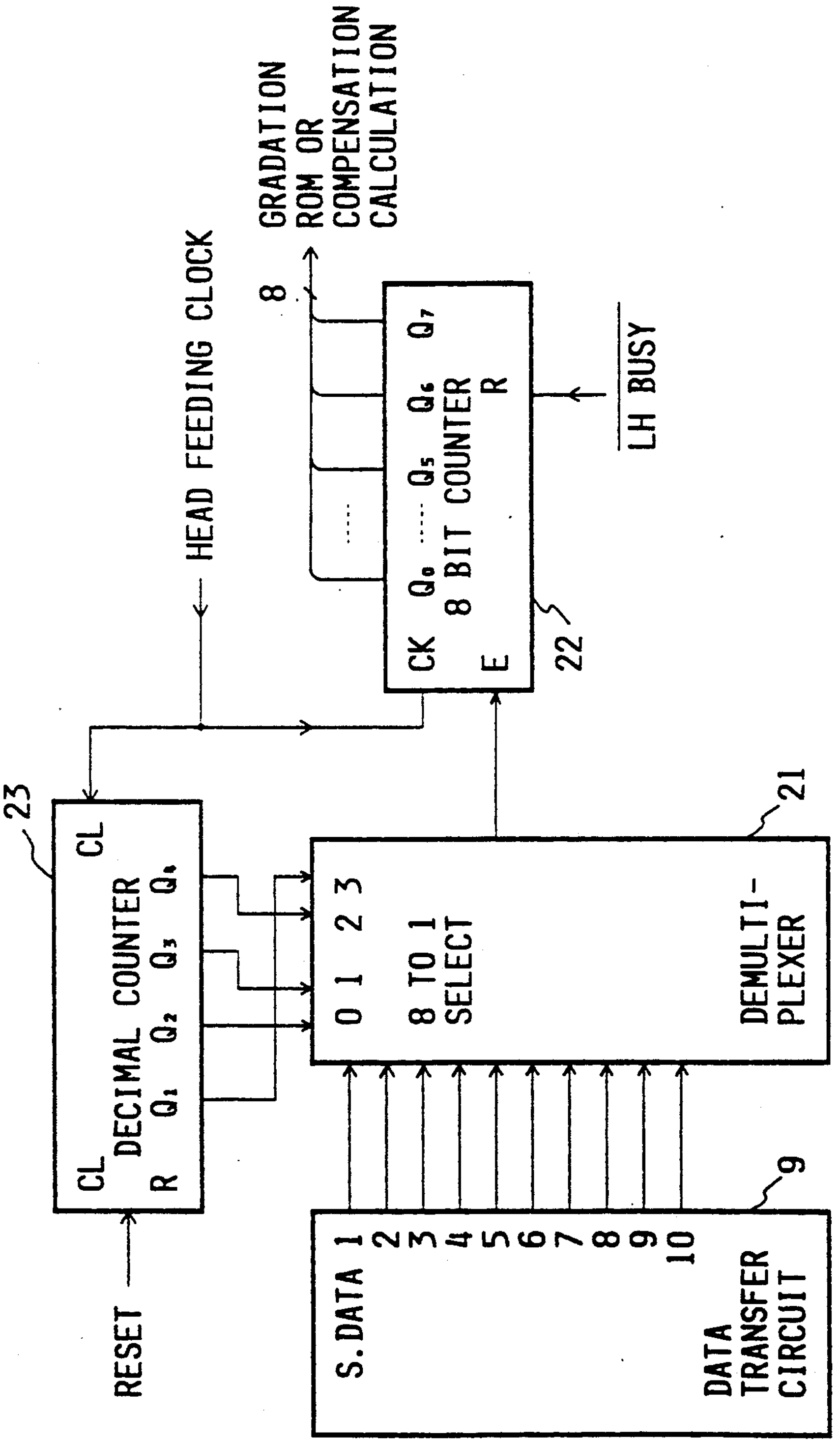
FIG. 2 is a detailed circuit diagram showing the inventive print rate compensating circuit.

FIG. 2 is a detailed circuit diagram showing the print rate compensating circuit 10. The linear thermal print head is divided into 10 blocks (namely, n=10). In this regard, the data transfer circuit 9 outputs correspondingly 10 number of serial data trains Data 1-Data 10. Each block contains less than 256 number of thermal printing elements each effective to print a single dot. The print rate compensating circuit 10 is comprised of a demultiplexer 21 receptive of the 10 number of outputs from the data transfer circuit 9, a counter 22 for counting outputs from the demultiplexer 21, and a decimal counter 23 (generally n-number system counter).

The next description is given for the operation of the print rate compensating circuit. The data transfer circuit 9 transfers drive information of a certain gradation level contained in one line to the print head 7 in the form of 10 number of serial data trains. At the same time, as shown in FIG. 3 timing chart, Data 1 through Data 10 are inputed into the demultiplexer 21 in the form of serial data trains in synchronization with a head transfer clock signal. The decimal counter 23 effects increment of its content in response to each clock pulse so as to switch or select cyclicly the 10 number of serial data trains in the demultiplexer 21. By such operation, the demultiplexer 21 outputs successively selected data segments or bits a, b, c . . . of the Data 1 through Data 10 to an input terminal of the counter 22 to thereby effect sampling of the 10 number of serial data trains.

The counter 22 counts the sampled data in response to each clock pulse such that in the FIG. 3 case the counter 22 is enabled in response to the data segments b, c . . . to effect count-up. By this, the one line data is divided into the ten blocks, and the ten number of divided data are time-sharingly or multiplexedly sampled and counted to detect the print rate. The counter 22 is operated each gradation level within one line driving so that the counter 22 is repeatedly reset m times (m is a number of gradation levels) in response to $\overline{\text{LHBUSY}}$ signal shown in FIG. 2 within each line printing.

The next description is given for the method of compensating for the print rate. FIG. 4 shows the relation between the gradation level and the accumulated drive pulse width. Further, the gradated printing is carried out by a sequence of drive pulse components which have gradually reducing pulse widths as shown in the FIG. 5 waveform. Therefore, the accumulated pulse width rapidly rises at initial stage of gradation levels and moderately rises at last stage of gradation levels.

FIG. 6 shows a three dimensional pulse width table in terms of the gradation level, the thermal head temperature and the print rate of dots. Therefore, the optimum pulse width T is generally determined according to these three factors. In this invention, the memory 4 is stored with this gradation pulse width table. The table content is retrieved according to the output value from the counter 22 so that the retrieved optimum content is set in the timer 5 to enable the driving of the print head 7 during the operation of the timer 5.

By such operation, the optimum drive pulse width can be selected from the pulse width table according to the print rate of dots to thereby compensate for the print rate to avoid variation of print density. In the above embodiment, the print rate is compensated for by means of the FIG. 6 pulse width table; however, another type of the table which would preclude the print rate can be utilized for the compensation.

In another way, a compensative coefficient k is retrieved from the memory 4 according to the output of the counter 22 as follows:

| counted value | 0 | 1 | . . . | 127 | . . . | 255 |
|---|---|---|---|---|---|---|
| compensative coefficient k | 0.5 | 0.52 | . . . | 0.75 | . . . | 1.0 |

Then, a set value T of the timer 5 is determined according to the following relation:

$$T = To \times k\ (us)$$

where a timer constant To is selected according to a given gradation level from a pulse width table stored in the memory 4 as follows:

| gradation level | 1 | 2 | . . . | 31 | . . . | 64 |
|---|---|---|---|---|---|---|
| timer constant To | 1000 | 200 | . . . | 100 | . . . | 70 |

In the above case, the number m of gradation levels is set to 64. The above described compensation is carried out for each gradation level during one line printing operation. Therefore, the accurate compensation for the print rate can be ensured in the multi-gradation printer as well as in the binary dot printer having no gradation.

In order to minimize sampling error, the following relation should be established:

$$N \neq h \times n \times m$$

where N denotes total dot number contained in one line, n denotes the number system of the counter 23, m denotes number of the gradation levels, and h denotes on integer constant. By such setting, sampling data segments in the data trains are shifted every line printing to thereby randomize the sampling to reduce error. The sampling error may increase when the sampling data segments are fixed every line printing along widthwise of a printed image which contains stripe or elongated pattern in a feeding direction of a print paper sheet. Therefore, the print rate can be more accurately detected by shifting the position of sampling data segments widthwise of the print paper sheet. The inventive sampling method may not significantly improve print quality of a line drawing image in view of its generally low print dot rate. The line drawing image may not require accurate compensation for the print dot rate. On the other hand, the gradated image has a close correlation between adjacent image elements in contrast to the line drawing image, hence the above described sampling method can achieve practically sufficient accuracy.

As described above, according to the invention, the compensation for the print rate can be accurately effected in the multi-gradation printer and the high speed printer, thereby effectively avoiding density variation in the paper feeding direction at a spot where the print rate varies along the line, and avoiding printing blur.

What is claimed is:

1. In a line printer having a print head composed of a plurality of dot-forming elements arranged lineary along widthwise of a print paper sheet for printing an image and character according to print data, the improvement comprising: a data transfer circuit for transferring a plurality of serial print data trains to the print head; a demultiplexer for selectively sampling the serial print data trains from the data transfer circuit; a counter for counting the sampled data so as to determine a print dot rate; and means for adjusting a width of drive pulses applied to the print head so as to compensate for the print dot rate.

2. A line printer according to claim 1; wherein said means includes a memory which stores a table effective to determine the width of drive pulses according to the print dot rate.

3. A line printer according to claim 1; including means for shifting a sampling position of the print data for each line printing operation.

4. In a line printer comprising a print head having a plurality of dot-forming elements arranged linearly along a width of a print paper sheet for printing image and character data; said printer including a data transfer circuit for transferring a plurality of serial print data trains to the print head and a print rate compensating circuit for reducing variation in print density caused by differences in print rates, said compensating circuit comprising:

a demultiplexer for receiving outputs from said data transfer circuit and for selectively sampling the serial print data trains from the data transfer circuit;

a counter for receiving an output from the demultiplexer and for counting sampled data to determine a print dot rate; and adjusting means for adjusting widths of drive pulses based on said print dot rate so as to provide an optimum pulse width for the print dot rate and thereby reduce variation in print density.

5. The line printer of claim 4, wherein the pulse width is determined from a table which determines the width of drive pulse according to the print dot rate.

6. The line printer of claim 4, wherein the adjusting means includes means for determining the width of drive pulses based upon a product of a compensative coefficient and a timer constant and wherein the compensative coefficient varies according to counted values output by the counter and the timer constant varies according to a gradation level.

* * * * *